No. 816,305. PATENTED MAR. 27, 1906.
F. P. DUNN.
COMPUTING PUMP APPARATUS.
APPLICATION FILED JULY 13, 1905.
2 SHEETS—SHEET 1.
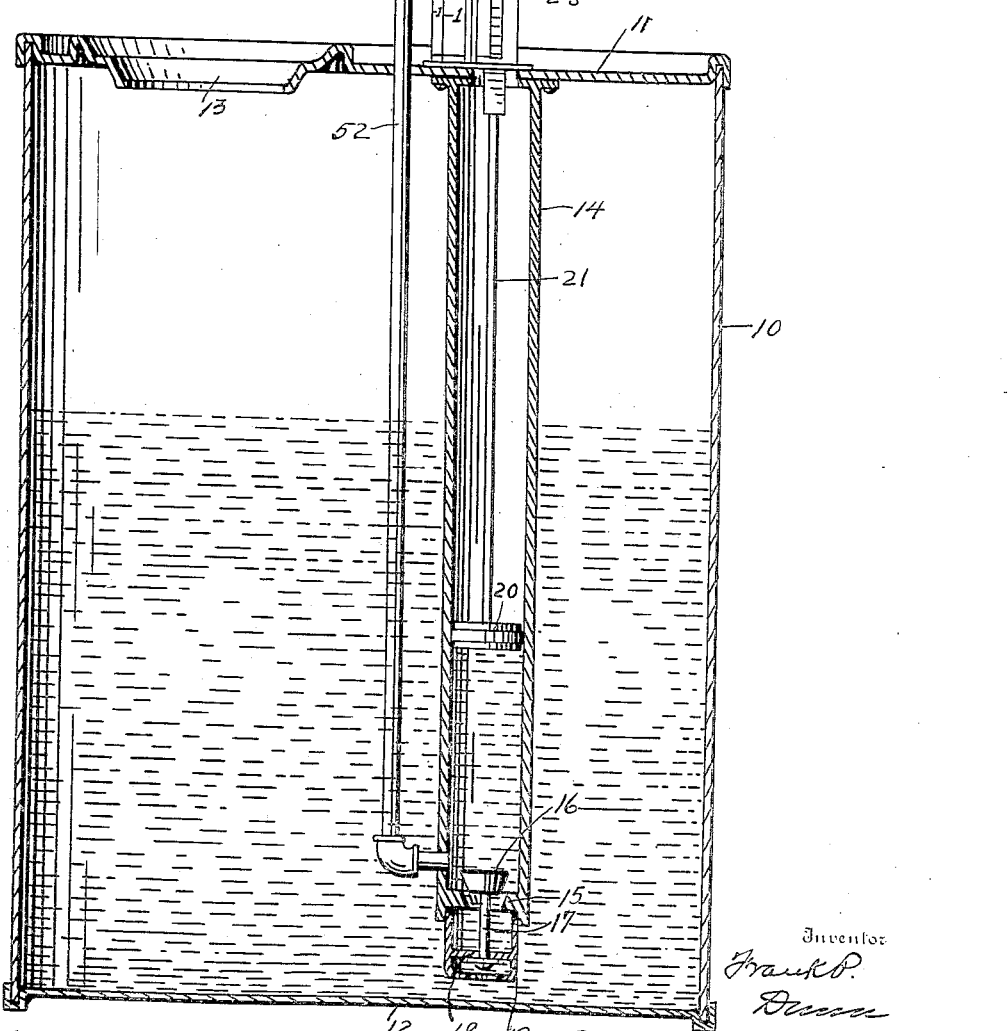

No. 816,305. PATENTED MAR. 27, 1906.
F. P. DUNN.
COMPUTING PUMP APPARATUS.
APPLICATION FILED JULY 13, 1905.
2 SHEETS—SHEET 2.
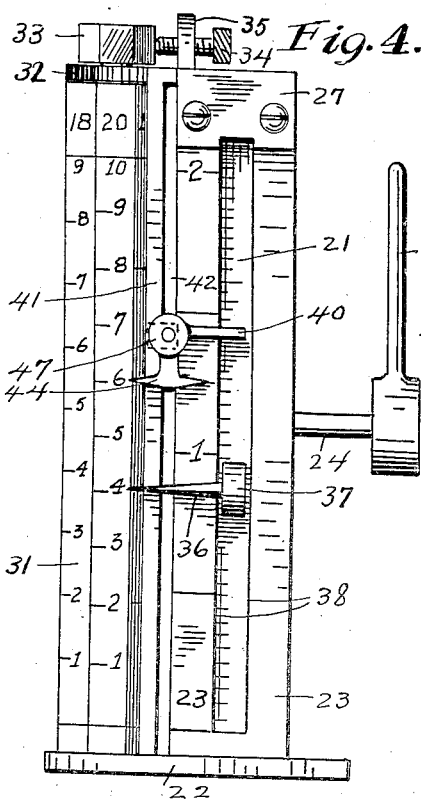
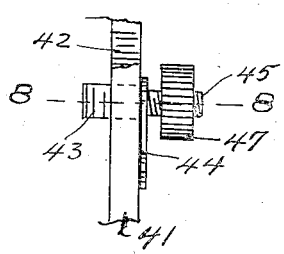
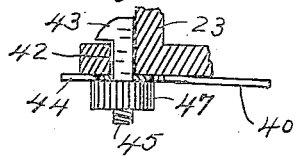
Witness
C. G. Hoen
N. Allemong
Inventor
Frank P. Dunn
By V. H. Lockwood
His Attorney

UNITED STATES PATENT OFFICE.

FRANK P. DUNN, OF ANDERSON, INDIANA, ASSIGNOR TO THE ANDERSON TOOL COMPANY, OF ANDERSON, INDIANA, A CORPORATION OF INDIANA.

COMPUTING-PUMP APPARATUS.

No. 816,305.  Specification of Letters Patent.  Patented March 27, 1906.

Application filed July 13, 1905. Serial No. 269,565.

*To all whom it may concern:*

Be it known that I, FRANK P. DUNN, of Anderson, county of Madison, and State of Indiana, have invented a certain new and useful Computing-Pump Apparatus; and I do hereby declare that the following is a full, clear, and exact description thereof, reference being had to the accompanying drawings, in which like numerals refer to like parts.

The object of this invention is to make a practical and useful computing-pump apparatus, especially in combination with tanks, barrels, cans, and similar vessels. The various features of the invention will be understood from the accompanying drawings and the following description and claims.

In the drawings, Figure 1 is a central vertical section through the device. Fig. 2 is a central vertical section of the funnel and a side elevation of a part of the outlet-tube, showing the funnel elevated. Fig. 3 is a section on the line 3 3 of Fig. 1. Fig. 4 is a front elevation of the means for guiding and actuating the piston-rod and the scales, the piston-rod being partially elevated. Fig. 5 is an elevation of the right-hand side of what is shown in Fig. 4 with parts broken away. Fig. 6 is a section on the line 6 6 of Fig. 5. Fig. 7 is a side elevation of the adjustable stop and the means to which it is attached, the latter being partly broken away. Fig. 8 is a section on the line 8 8 of Fig. 7.

In the first place I make a tank, the side walls 10 of which are made of sheet metal and the top 11 and bottom 12 are made of cast-iron, so that the tank will be strong, and a firm unyielding top will be provided for mounting the pump. It has a drain-inlet at 13, which is adapted to receive and hold the bottom of the oil-can or other vessel while it is being charged by the pump.

The pump-cylinder 14 is secured to the top of the vessel and extends down nearly to the bottom, having at its lower end a valve-seat 15, which is closed by a valve 16, the stem 17 of which is vertically movable through a guide-plate 18 in the removable end piece 19, that screws into the lower end of the cylinder and is soldered or otherwise made air-tight. The piston 20 has a piston-rod 21 secured to it, which at its upper end is enlarged and squared and has a rack on the rear side of it. Upon the top of the vessel or tank a plate 22 is secured having upright pieces 23 extending from it to form a guide for the upper end of the piston-rod. These uprights are widened into plates, as shown in Fig. 5, so that the rod 24 is fulcrumed therein, said rod having secured to it the segment 25, that meshes with the rack 21 for actuating the piston-rod. The lever 26 on the rod 24 operates the segment. To the upper end of the guiding-pieces 23 a plate 27 is secured, as seen in Figs. 4 and 5, on the front side, and to the rear a plate 28 is secured to hold said guide-pieces in place.

A quantity or measurement scale is marked on the left-hand guide-piece 23, as seen in Fig. 4. The numerals in that scale indicate quarts, and the lines or marks indicate pints. A rotary scale-bar 31 is mounted between the plate 22 at the bottom and the plate 32, extending from the top of one of the pieces 23, as appears in Fig. 4. Said scale-bar is hexagonal, and on each face a price or value scale is marked. At the upper end the prices per gallon are placed, those shown in Fig. 4 being eighteen and twenty cents per gallon, respectively. On the portion of the scale-bar below the top the numerals indicate cents, the scale being placed to suit the different prices per gallon. On these faces the different scales are therefore found, and by turning the nut 33 at the upper end one of said six faces may be turned to the front, and by means of the set-screw 34, operating through the lug 35, the scale-bar may be held in any desired position. A pointer 36 extends from the lug 37 on the upper part of the piston-rod 21. Said lug extends through the front slot 38 between the upright pieces 23 and moves up and down along said slot. The pointer 36 points to both the quantity and the value scales.

If in operation one wishes one quart of liquid, he elevates the lever 26 until the pointer 36 reaches the numeral "1" on the quantity-scale. That causes the piston to draw into the cylinder one quart of fluid. Then by depressing the lever 26 a quart will be discharged. If a complete stroke of the lever 26 is made, raising the pointer 36 to the top, one-half gallon of liquid will be discharged. If one wants four cents' worth of fluid, the lever 26 is elevated until the pointer is opposite the numeral "4," as shown in Fig. 4, and that will draw four cents' worth of the fluid into the cylinder, and when the lever is depressed four cents' worth will be discharged. For fluid of varying prices the scale-bar 31 is turned so as to present the correct price per gallon to the front. In this connection I also provide an adjustable stop 40 by aid of a bar 41 to the side of the left-hand upright piece 23, so as to make a slot 42, and through that a square-shanked rod 45 extends with a head 43. On the square portion of said rod 45 a downwardly-extending indicator 44 is placed having two pointers, one at each scale, and said indicator is integral with the stop 40, the latter being mounted on said rod 45 also. The front end of the rod 45 is threaded to receive a thumb-nut 47, whereby the stop and indicator may be clamped at any desired point with reference to the two scales. This stop is useful when it is desired to repeatedly discharge a uniform quantity of liquid at each complete operation of the lever. Thus if the stop is set as in Fig. 4 six cents' worth of fluid will be discharged at every complete operation of the lever 26, as the upward movement of the piston-rod will be limited by the stop 40, engaging the lug 37 on the piston-rod that carries the pointer 36, and the pointer 36 thereon will agree with the pointers on the indicators 44. When it is not desired to use the adjustable stop, it may be moved to the top and left there, where it will be out of the way of the pointer 36. A removable funnel 50 is provided with a top cross-piece 51, having a hole in it through which the downwardly-turned discharge end of the discharge-pipe 52 extends loosely. A nut 53 is secured to the discharge end of the pipe 52 to permit the funnel to be slipped up on the end of the discharge-pipe as the vessel or oil-can is moved into place under it to be filled and then the funnel is dropped down with its small end extending into the mouth of the oil-can or other vessel. This construction prevents the misplacement of the funnel. It is always in place, and it does not prevent putting vessels in place to be filled or removing the same.

What I claim as my invention, and desire to secure by Letters Patent, is—

1. In a computing-pump apparatus, the combination with the piston-rod, of a stationary scale with graduations that indicate the extent of movement of the piston-rod required to discharge any desired quantity of fluid at one operation of the piston-rod, and an adjustable stop movable adjacent the scale and coöperating with the graduations thereon that limits the movement of the piston-rod whereby at each complete operation thereof a uniform quantity of fluid will be discharged.

2. In a computing-pump apparatus, the combination with the piston-rod, of a stationary scale with graduations that indicate the extent of movement of the piston-rod required to discharge fluid of any desired value at one operation of the piston-rod, and an adjustable stop movable adjacent said scale and coöperating with the graduations thereon that limits the movement of the piston-rod whereby fluid of unity of value will be discharged at each complete operation of the piston-rod.

3. In a computing-pump apparatus, the combination with the piston-rod, of a stationary quantity-scale with graduations that indicate the extent of movement of the piston-rod required to discharge fluid of any desired quantity at one operation of the piston-rod, a vertically-stationary value-scale parallel with said quantity-scale with graduations that indicates the extent of movement of the piston-rod required to discharge fluid of any desired value at one operation of the piston-rod, a pointer connected with said piston-rod extending to both of said scales, and an adjustable stop in the path of said pointer and which is movable adjacent said scales and coöperating with the graduations thereon.

4. In a computing-pump apparatus, the combination of a piston-rod with a rack on the upper end thereof, a guide for the movement of said piston-rod slotted vertically on two opposite sides, a scale parallel with said guide, indicating means extending from the piston-rod through one of said slots to said scale, a lever, and an actuating-segment operated thereby and extending through the other one of said slots in connection with said rack for operating the piston-rod.

5. The combination with a tank, of a pump-cylinder secured to the top thereof and extending down into the tank, a discharge-tube leading from the lower part of said cylinder up through the top of the tank, a piston-rod extending up through the top of said tank, a guide for the piston-rod secured upon the top of said tank, means mounted in connection with said guide for actuating the piston-rod, a scale secured to said guide and parallel therewith, a pointer on the piston-rod and extending to said scale, and an adjustable stop mounted on said guide for limiting the movement of the piston-rod and setting the device so that it will discharge a uniform quantity of fluid at each complete operation of the piston-rod.

In witness whereof I have hereunto affixed my signature in the presence of the witnesses herein named

FRANK P. DUNN.

Witnesses:
V. H. LOCKWOOD,
N. ALLEMONG.